No. 892,401. PATENTED JULY 7, 1908.
H. VON CELSING.
COVERING FOR MILKING ORGANS.
APPLICATION FILED APR. 6, 1907.
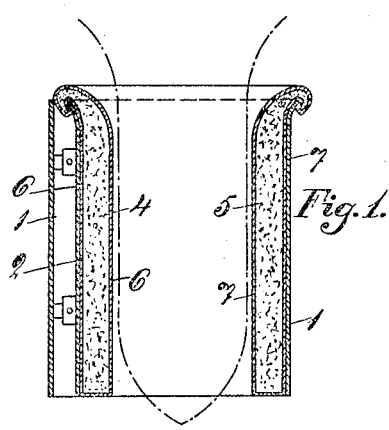
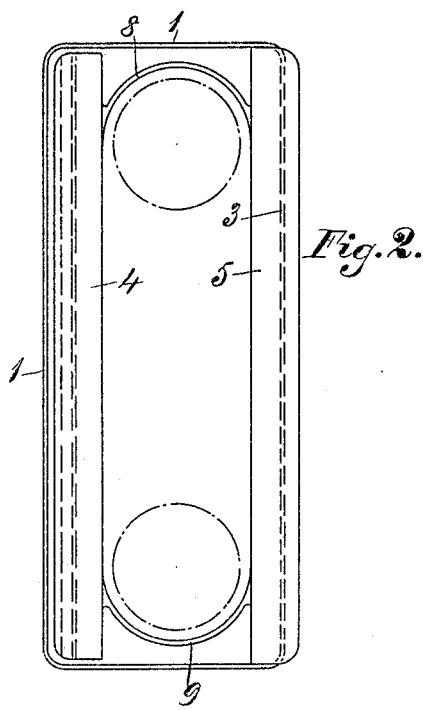
WITNESSES
INVENTOR

UNITED STATES PATENT OFFICE.

HENRIK VON CELSING, OF STOCKHOLM, SWEDEN.

COVERING FOR MILKING ORGANS.

No. 892,401.  Specification of Letters Patent.  Patented July 7, 1908.

Application filed April 6, 1907. Serial No. 366,872.

*To all whom it may concern:*

Be it known that I, HENRIK VON CELSING, citizen of Sweden, residing at Stockholm, Sweden, have invented new and useful Improvements in Coverings for Milking Organs, of which the following is a specification.

The present invention refers to an improvement in coverings for milking organs especially in such coverings which consist of spongy caoutchouc or india rubber.

It has been held convenient to cover the milking organs in milking machines with spongy caoutchouc so that the teats will be squeezed between the milking organs in a soft and elastic manner without being damaged. Owing to its porous nature the spongy caoutchouc however with eagerness will absorb milk, with which it comes into contact during the milking operation, and such absorption will result in difficulties of cleaning the milking organs.

The present invention has for its object to obviate this inconvenience and consists in covering the spongy caoutchouc with a thin film of water proof material, for instance ordinary caoutchouc, such films being made sufficiently thick to prevent the spongy caoutchouc from absorbing fluid, without diminishing the elasticity of the covering in any practical degree.

For making the invention more fully understood the accompanying drawing illustrates a milking organ, comprising two plates, between which two teats simultaneously are squeezed and the milking thus performed.

Figure 1 is a transverse section of the milking organ, and Fig. 2 a plan of the same.

1 indicates a rectangular casing without bottom and cover. Within the casing a plate 2 is movable to and fro in such a manner that the teats during the forward movement of the plate 2 are squeezed against the rear wall 3 of the casing, such squeezing taking place from the root of the teat downwards to the lower part of the teat. The movement of a milking plate towards a stationary plate for milking purposes is previously well known and need no further description, the more as it constitutes no part of the present invention. The plate 2 and the rear wall 3 of the casing constituting the milking organs are covered with plates 4 and 5 made of spongy caoutchouc. In order to obviate that said plates 4 and 5 may obsorb milk with which they will come in contact during the milking operation, they are coated with a thin film 6 and 7 respectively, which may extend round the plates so that all their side surfaces are coated by the film, as shown on the drawing, or said coating may be applied only on the inner side surfaces of the plates between which the teats are squeezed. The film may be made of any suitable water proof material, which does not influence practically speaking the softness of the plates 4, 5. Ordinary caoutchouc has proved to be a suitable material for this purpose. Said coating may be fixed to the plates 4, 5 in any suitable manner and may also consist of an impregnation of caoutchouc or the like on the surfaces of the plates 4, 5.

8 and 9 indicate flexible side walls connecting the milking organs laterally and adapted to prevent the teats from being pressed against the shorter side walls of the casing 1 when being squeezed between the plates 4 and 5.

The described manner of coating the coverings with a water proof material is employable not only for milking organs, comprising plates as described and shown, but also to every kind of milking organs, by means of which the milking operation is performed. The invention is therefore not limited to the milking organs shown.

Having now particularly described my invention and set forth in what manner the same is to be performed, I claim:—

1. In milking machines a spongy covering for the milking organs coated with a film of water proof material.

2. In milking machines the combination with the milking organs, consisting of a stationary and a reciprocating plate, of spongy coverings for said plates, coated with a film of water proof material.

3. In milking machines a milking organ comprising a stationary and a reciprocating plate, caoutchouc plates covering the insides of said milking organs, and connected by lateral flexible side walls.

4. In milking machines a covering for the milking organs, comprising plates of spongy caoutchouc, coated with a film of water proof material.

5. In milking machines a covering for the milking organs, comprising plates of spongy caoutchouc, coated with a film of water proof material and connected laterally by means of flexible side walls.

In testimony whereof I have signed my name to this specification in the presence of two subscribing witnesses.

HENRIK VON CELSING.

Witnesses:
 WALDEMAR BOMAN,
 T. EKEBOHM.